(12) United States Patent
Wen et al.

(10) Patent No.: US 11,233,270 B2
(45) Date of Patent: Jan. 25, 2022

(54) GEL POLYMER ELECTROLYTE AND ELECTROCHEMICAL DEVICE COMPRISING THE SAME

(71) Applicant: NINGDE AMPEREX TECHNOLOGY LIMITED, Ningde (CN)

(72) Inventors: Qian Wen, Ningde (CN); Bin Wang, Ningde (CN); Junfei Liu, Ningde (CN); Shuirong Zhang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 0 days.

(21) Appl. No.: 16/394,051

(22) Filed: Apr. 25, 2019

(65) Prior Publication Data

US 2020/0168949 A1 May 28, 2020

(30) Foreign Application Priority Data

Nov. 26, 2018 (CN) .......................... 201811419534.2

(51) Int. Cl.

| | |
|---|---|
| *H01M 10/0565* | (2010.01) |
| *C08F 212/08* | (2006.01) |
| *C08F 220/14* | (2006.01) |
| *C08J 3/09* | (2006.01) |
| *C08J 3/11* | (2006.01) |
| *H01M 10/052* | (2010.01) |
| *H01G 11/56* | (2013.01) |

(52) U.S. Cl.
CPC ....... *H01M 10/0565* (2013.01); *C08F 212/08* (2013.01); *C08F 220/14* (2013.01); *C08J 3/095* (2013.01); *C08J 3/11* (2013.01); *H01M 10/052* (2013.01); *H01G 11/56* (2013.01); *H01M 2300/0085* (2013.01)

(58) Field of Classification Search
CPC ......... H01M 10/0565; C08J 3/095; C08J 3/11
USPC .......................................................... 429/303
See application file for complete search history.

(56) References Cited

U.S. PATENT DOCUMENTS

| | | | |
|---|---|---|---|
| 6,395,429 B1 | 5/2002 | Kang et al. | |
| 9,540,312 B2* | 1/2017 | Teran | ...................... C07C 69/96 |
| 2018/0183097 A1* | 6/2018 | Yamazaki | ......... H01M 10/0525 |

FOREIGN PATENT DOCUMENTS

| | | |
|---|---|---|
| CN | 101803100 A | 8/2010 |
| CN | 104885289 A | 9/2015 |
| CN | 105355968 A | 2/2016 |
| CN | 105720304 A | 6/2016 |
| JP | 2011129352 A | 6/2011 |
| JP | 2012033346 A | 2/2012 |

OTHER PUBLICATIONS

Chinese First Office Action dated Apr. 27, 2020 in counterpart Chinese application 201811419534.2, 8 pages.

* cited by examiner

*Primary Examiner* — James M Erwin

(74) *Attorney, Agent, or Firm* — Juan Carlos Marquez; Marquez IP Law Office, PLLC

(57) ABSTRACT

The present application relates to a gel polymer electrolyte and an electrochemical device comprising the gel polymer electrolyte. The gel polymer electrolyte according to the present application comprises a polymer film and an organic electrolytic solution comprising a lithium salt, a phosphate ester compound, and a fluoroether compound. The gel polymer electrolyte according to the present application has higher ionic conductivity and better electrochemical stability, and is capable of significantly improving the safety and cycle performance of the electrochemical device.

18 Claims, No Drawings

GEL POLYMER ELECTROLYTE AND ELECTROCHEMICAL DEVICE COMPRISING THE SAME

CROSS REFERENCE TO RELATED APPLICATIONS

The present application claims the benefit of priority from China Patent Application No. 201811419534.2, filed on 26 Nov. 2018, the disclosure of which is hereby incorporated by reference in its entirety.

BACKGROUND

1. Field of the Invention

The present application relates to the technical field of energy storage technologies, and more particularly to, a gel polymer electrolyte and an electrochemical device comprising the gel polymer electrolyte.

2. Description of the Related Art

Lithium ion batteries have been widely used due to their advantages such as environmental friendliness, high operating voltage, large specific capacity and long cycle life, and have become a new green chemical power source with the most promising development prospect in the world. Soft-package batteries with small package thickness and light weight are preferred. With the rapid development of the lithium battery industry, even higher requirements have been raised for lithium-ion batteries, such as: lighter weight, thinner thickness, smaller volume and higher energy density. With the further improvement of the energy density of lithium ion batteries, lithium metal batteries have received extensive attention.

The conventional liquid organic electrolytic solution cannot be directly applied to lithium metal batteries. The all-solid polymer electrolyte has the advantages of high mechanical strength of the film, low reactivity with the electrode and high voltage stability, thereby improving the safety performance of the battery. However, ionic conductivity of an all-solid polymer electrolyte at room temperature is at least three orders of magnitude lower than that of a liquid electrolyte. In addition, the interface contact between the electrode/electrolyte of a lithium ion battery comprising an all-solid polymer electrolyte is very poor, and the high interface transmission impedance makes the all-solid lithium ion battery unable to meet practical needs.

In order to solve the above problems, the present application provides a gel polymer electrolyte. The gel polymer electrolyte of the present application has the advantages of having both a liquid electrolyte and an all-solid electrolyte. Not only can the safety performance of the lithium ion battery be effectively improved, but also the problem of low electrical conductivity of the all-solid electrolyte is solved. The gel polymer electrolyte of the present application has ionic conductivity of $10^{-3}$ S/cm. The gel polymer electrolyte has good compatibility with the electrode, so that the interface impedance is low, and thus has a broad application prospect in the lithium battery industry.

SUMMARY

The present application provides a gel polymer electrolyte and an electrochemical device comprising the gel polymer electrolyte. The gel polymer electrolyte has higher ionic conductivity and better electrochemical stability, and can significantly improve the safety and cycle performance of the electrochemical device.

In one embodiment, the present application provides a gel polymer electrolyte, wherein the gel polymer electrolyte comprises a polymer film and an organic electrolytic solution, wherein the organic electrolytic solution comprises a lithium salt, a phosphate ester compound, and a fluoroether compound.

According to some embodiments of the present application, based on the total weight of the organic electrolytic solution, the weight percentage (X) of the phosphate ester compound and the weight percentage (Y) of the fluoroether compound meet the conditions represented by Formula (1) and Formula (2):

$$\text{about } 20 \text{ wt \%} \leq X+Y \leq \text{about } 85 \text{ wt \%} \quad (1); \text{ and}$$

$$\text{about } 0.2 \leq X/Y \leq \text{about } 5 \quad (2).$$

According to some embodiments of the present application, the phosphate ester compound is a compound of Formula I:

Formula I where $R_1$, $R_2$ and $R_3$ are each independently a substituted or unsubstituted saturated hydrocarbyl having 1 to 10 carbon atoms, a substituted or unsubstituted unsaturated hydrocarbyl having 1 to 10 carbon atoms, a substituted or unsubstituted aryl group having 6 to 20 carbon atoms, or a substituted or unsubstituted hydrocarbyloxy group having 1 to 10 carbon atoms, where when substituted, the substituent is selected from halogens.

According to some embodiments of the present application, the phosphate ester compound is one or more phosphate ester compounds selected from trimethyl phosphate, triethyl phosphate, tripropyl phosphate, triallyl phosphate, tributyl phosphate, trioctyl phosphate, triphenyl phosphate, tris(chloroethyl) phosphate, tris(1,3-difluoropropyl) phosphate, and tris(trifluoroethyl) phosphate.

According to an embodiment of the present application, the fluoroether compound is a compound of Formula II:

Formula II where $R_4$ and $R_5$ are each independently a saturated hydrocarbyl having 1 to 8 carbon atoms, an unsaturated hydrocarbyl having 1 to 8 carbon atoms, a saturated hydrocarbyl having 1 to 10 carbon atoms that is partially or completely substituted by a fluorine atom, or an unsaturated hydrocarbyl having 1 to 10 carbon atoms that is partially or completely substituted by a fluorine atom.

According to some embodiments of the present application, the fluoroether compound is one or more fluoroether compounds selected from: $CF_3CH_2OCH_2CF_3$, $HCF_2CF_2OCF_2CF_2H$, $HCF_2CF_2CH_2OCF_2CF_2H$, $CF_3CF_2OCF_2CF_3$, $HCF_2CF_2OCH_2CF_2CF_2H$, $(CF_3)_2CFCF(CF_2CF_3)(OCH_3)$, $CF_3CHFCF_2CH(CH_3)OCF_2CHFCF_3$, $HCF_2CF_2CH_2OCF_2CF_2CF_2H$ or $HCF_2CF_2OCH_2CF_3$.

According to some embodiments of the present application, the organic electrolytic solution further comprises an additive, wherein, based on the total weight of the organic electrolytic solution, the weight percentage of the additive is about 0.1-10 wt %.

According to some embodiments of the present application, the additive is one or more additives selected from vinylethylene carbonate, lithium bis(oxalato) borate, lithium difluoro(oxalato) borate, lithium tetrafluoroborate, methylene methanedisulfonate, 4-trifluoromethylethylene carbonate, 1,3,2-dioxazolthiophene-2,2-dioxide, fluoroethylene carbonate, ethylene sulfite, vinylene carbonate, dimethyl sulfone, vinyl sulfone, diethyl sulfone, methyl vinyl sulfone, methyl ethyl sulfone, sulfolane, propylene sulfite, propenyl-1,3-sultone, bis (trimethylsilyl) sulfate, lithium nitrate, succinic anhydride, N-methyl butyl pyrrolidinium bis(trifluoromethylsulfonyl)imide, N-methyl propyl piperidinium bis(trifluoromethylsulfonyl)imide, 1,3-dioxane or 1,4-dioxane.

According to some embodiments of the present application, the polymer film comprises a polymer matrix, wherein the polymer matrix is one or more selected from the following polymers: a polyether polymer, a polyamine polymer, a polythioether polymer, a polyacrylate polymer, and a polymer obtained by copolymerizing or blending the above polymers, or modifying the above polymers with functional groups.

According to some embodiments of the present application, the substance for blending is one or more compounds selected from $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, a lithium titanium phosphate, wherein the lithium titanium phosphate is $LixTiy(PO_4)_3$ and wherein $0<x<2$ and $0<y<3$, a lithium aluminum titanium phosphate, where the lithium aluminum titanium phosphate is $LixAlyTiz(PO_4)_3$ and wherein $0<x<2$, $0<y<1$, and $0<z<3$, $Li_{1+x+y}$ $(Al, Ga)_x$ $(Ti, Ge)_{2-x}Si_yP_{3-y}O_{12}$, and wherein $0 \leq x \leq 1$ and $0 \leq y \leq 1$, a lithium lanthanum titanate, wherein the lithium lanthanum titanate is $Li_xLa_yTiO_3$ and wherein $0<x<2$ and $0<y<3$, a lithium germanium thiophosphate, wherein the lithium germanium thiophosphate is $Li_xGe_yP_zS_w$ and wherein $0<x<4$, $0<y<1$, $0<z<1$, and $0<w<5$, a lithium nitride, wherein the lithium nitride is $Li_xN_y$ and wherein $0<x<4$ and $0<y<2$, $SiS_2$ glass, wherein the $SiS_2$ glass is $Li_xSi_yS_z$ and wherein $0 \leq x<3$, $0<y<2$ and $0<z<4$, $P_2S_5$ glass, wherein the $P_2S_5$ glass is $Li_xP_yS_z$ and wherein $0 \leq x<3$, $0<y<3$ and $0<z<7$) or a garnet ceramic, wherein the garnet ceramic is $Li_{3+x}La_3M_2O_{12}$ and wherein $0 \leq x \leq 5$ and M is Te, Nb, or Zr.

According to some embodiments of the present application, the polymer matrix is a polymer of Formula III:

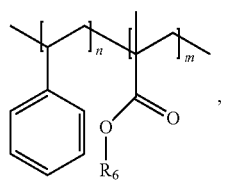

Formula III where each $R_6$ is independently a substituted or unsubstituted alkyl group having 1 to 12 carbon atoms, a substituted or unsubstituted cycloalkyl group having 3 to 12 carbon atoms, a substituted or unsubstituted alkenyl group having 2 to 12 carbon atoms, a substituted or unsubstituted alkynyl group having 3 to 12 carbon atoms, a substituted or unsubstituted aryl group having 6 to 20 carbon atoms, or a substituted or unsubstituted heterocyclyl group having 1 to 12 carbon atoms, wherein when substituted, the substituent is one or more selected from halo, cations, cyano or carboxyl, in which the cation is one or more selected from imidazolium cations, pyridinium cations, quaternary ammonium cations, quaternary phosphonium cations, triazolium cations, pyrrolidinium cations, piperidinium cations, guanidinium cations, mazolium cations, azolidinium cations, amino acid cations, or sulfonium cations; and n and m independently represent any integer from about 1 to 100,000.

According to some embodiments of the present application, the polymer film further comprises an ionic liquid, wherein, based on the weight of the polymer film, the weight percentage of the ionic liquid is about 1-30 wt %. According to some embodiments of the present application, the ionic liquid comprises a cation and an anion, wherein the cation is one or more selected from imidazolium cations, pyridinium cations, quaternary ammonium cations, quaternary phosphonium cations, triazolium cations, pyrrolidinium cations, piperidinium cations, guanidinium cations, mazolium cations, azolidinium cations, amino acid cations, or sulfonium cations; and wherein the anion is one or more selected from tetrafluoroborate anions, hexafluorophosphate anions, sulfate anions, lactate anions, p-toluenesulfonate anions, acetylsulfonimide anions, saccharin anions, amino acid anions, dicyanamide anions, difluorosulfonimide anions or bis(trifluoromethyl) sulfonimide anions.

According to some embodiments of the present application, the ionic liquid is selected from:

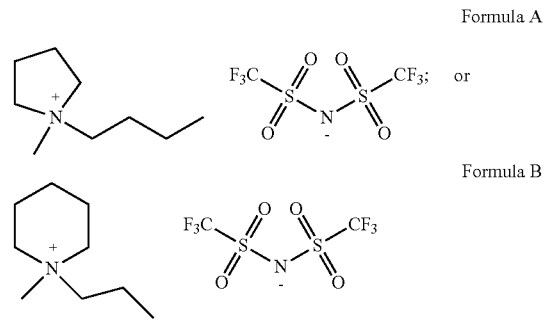

Formula A

Formula B or a combination thereof.

According to some embodiments of the present application, the lithium salt is one or more selected from: lithium perchlorate, lithium hexafluoroarsenate, lithium hexafluorophosphate, lithium bis(trifluoromethanesulfonyl) imide, lithium bis-(fluoro-sulfonyl)imide, lithium bis(oxalato) borate, lithium oxalyldifluoroborate, lithium tetrafluoroborate, lithium trifluoromethanesulfonate, lithium difluorophosphate, or an aromatic heterocyclic lithium salt.

According to some embodiments of the present application, the aromatic heterocyclic lithium salt is one or more selected from the following aromatic heterocyclic lithium salts:

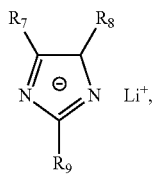

Formula IV

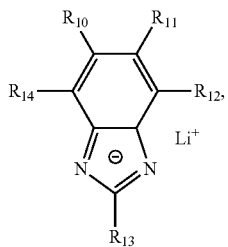

Formula V

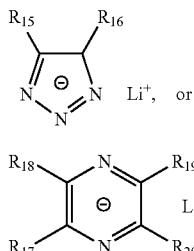

Formula VI

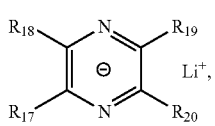

Formula VII wherein $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, and $R_{20}$ are each independently H, F, cyano, an alkyl group having 1 to 20 carbon atoms, a fluoroalkyl group having 1 to 20 carbon atoms, an alkenyl group having 2 to 20 carbon atoms, a fluoroalkenyl group having 2 to 20 carbon atoms, an aryl group having 6 to 26 carbon atoms, a fluoroaryl group having 6 to 26 carbon atoms, an alkylnitrile group having 2 to 21 carbon atoms, an alkenylnitrile group having 3 to 21 carbon atoms, or an arylnitrile group having 7 to 27 carbon atoms.

In another embodiment, the present application provides an electrochemical device, wherein the electrochemical device comprises a gel polymer electrolyte that is any gel polymer electrolyte as described above.

In another embodiment, the present application further provides an electronic device including the electrochemical device as described above.

Additional aspects and advantages of the embodiments of the present application will be partially described, illustrated or explained by way of examples in the description which follows.

DETAILED DESCRIPTION

Embodiments of the present application will be described in detail below. Throughout the specification of the present application, the same or similar components and components having the same or similar functions are denoted by like reference numerals. The embodiments described herein with respect to the figures are explanatory, and illustrative, and are provided to facilitate the basic understanding of the application. The embodiments of the present application should not be construed as limiting the present application. Unless otherwise expressly indicated, the following terms used herein have the meanings indicated below.

As used herein, the term "about" is used to describe and depict minor variations. When used in connection with an event or circumstance, the term may refer to an example in which the event or circumstance occurs precisely, and an example in which the event or circumstance occurs approximately. For example, when used in connection with a value, the term may refer to a range of variation less than or equal to ±10% of the stated value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios, and other values are sometimes presented in a range format in this application. It is to be understood that such a range format is provided for the sake of convenience and simplicity, and should be understood flexibly to include not only the numerical values that are explicitly defined in the range, but also all the individual values or sub-ranges that are included in the range, as if each value and sub-range are explicitly specified.

The term "hydrocarbyl" covers alkyl, alkenyl, alkynyl, cycloalkyl, and aryl groups. For example, the hydrocarbyl may be a straight-chain hydrocarbon structure having 1 to 20 carbon atoms. The hydrocarbyl also may be a branched or cyclic hydrocarbon structure having 3 to 20 carbon atoms. When a hydrocarbyl having a specific number of carbon atoms is defined, it may cover all geometric isomers having the carbon number. The hydrocarbyl herein may also be a hydrocarbyl having 1 to 15 carbon atoms, a hydrocarbyl having 1 to 10 carbon atoms, a hydrocarbyl having 1 to 5 carbon atoms, a hydrocarbyl having 5 to 20 carbon atoms, a hydrocarbyl having 5 to 15 carbon atoms or a hydrocarbyl having 5 to 10 carbon atoms. Additionally, the hydrocarbyl can be optionally substituted. For example, the hydrocarbyl may be substituted by halogen including fluorine, chlorine, bromine, and iodine, an alkyl group, an aryl group or a heteroaryl group.

The term "hydrocarbyloxy group" refers to the L-O— group, wherein L is alkyl, alkenyl, alkynyl, cycloalkyl, or aryl groups. The hydrocarbyloxy group herein may be a hydrocarbyloxy group having 1 to 20 carbon atoms, a hydrocarbyloxy group having 1 to 15 carbon atoms, a hydrocarbyloxy group having 1 to 10 carbon atoms, a hydrocarbyloxy group having 1 to 5 carbon atoms, a hydrocarbyloxy group having 5 to 20 carbon atoms, a hydrocarbyloxy group having 5 to 15 carbon atoms or a hydrocarbyloxy group having 5 to 10 carbon atoms.

The term "alkyl group" may be a linear saturated hydrocarbon structure having 1 to 20 carbon atoms. The alkyl group also may be a branched or cyclic hydrocarbon structure having 3 to 20 carbon atoms. For example, the alkyl group may be an alkyl group having 1-20 carbon atoms, an alkyl group having 1-10 carbon atoms, an alkyl group having 1-5 carbon atoms, an alkyl group having 5-20 carbon atoms, an alkyl group having 5-15 carbon atoms, or an alkyl group having 5-10 carbon atoms. When an alkyl group having a specific number of carbon atoms is defined, it may cover all geometric isomers having the carbon number. Therefore, for example, "butyl" means n-butyl, sec-butyl, isobutyl, tert-butyl and cyclobutyl; and "propyl" includes n-propyl, isopropyl and cyclopropyl. Examples of the alkyl group include, but not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornanyl and so on. Additionally, the alkyl group can be optionally substituted.

The term "cycloalkyl group" covers cyclic alkyl groups. The cycloalkyl group may be a cycloalkyl group having 2 to 20 carbon atoms, a cycloalkyl group having 6 to 20 carbon atoms, a cycloalkyl group having 2 to 10 carbon atoms, or a cycloalkyl group having 2 to 6 carbon atoms. For example, the cycloalkyl group may be cyclopropyl, cyclobutyl, cyclopentyl, cyclohexyl or the like. Additionally, the cycloalkyl group can be optionally substituted.

The term "alkenyl group" refers to a monovalent unsaturated hydrocarbyl which may be straight or branched and which has at least one and usually 1, 2 or 3 carbon-carbon double bonds. Unless otherwise defined, the alkenyl group typically contains from 2 to 20 carbon atoms, for example, the alkenyl group may be an alkenyl group having 2 to 20 carbon atoms, an alkenyl group having 6 to 20 carbon atoms, an alkenyl group having 2 to 10 carbon atoms or an alkenyl group having 2 to 6 carbon atoms. Representative alkenyl groups include (for example) ethenyl, n-propenyl, iso-propenyl, n-but-2-enyl, butyl-3-enyl, n-hex-3-enyl, and the like. Additionally, the alkenyl group can be optionally substituted.

The term "alkynyl group" refers to a monovalent unsaturated hydrocarbyl which may be straight or branched and which has at least one and usually 1, 2 or 3 carbon-carbon triple bonds. Unless otherwise defined, the alkynyl group typically contains from 2 to 20 carbon atoms, for example an alkynyl group having 2 to 20 carbon atoms, an alkynyl group having 6 to 20 carbon atoms, an alkynyl group having 2 to 10 carbon atoms or an alkynyl group having 2 to 6 carbon atoms. Representative alkynyl groups include (for example) ethynyl, prop-2-ynyl (n-propynyl), n-but-2-ynyl, n-hex-3-ynyl and the like. Additionally, the alkynyl group can be optionally substituted.

The term "aryl" covers both monocyclic and polycyclic systems. A polycyclic ring may have two or more rings in which two carbons are shared by two adjacent rings (where the rings are "fused"), in which at least one of the rings is aromatic and other rings may be for example, a cycloalkyl group, a cycloalkenyl group, an aryl group, a heterocyclyl group and/or a heteroaryl group. For example, the aryl group may be a $C_6$-$C_{50}$ aryl group, a $C_6$-$C_{40}$ aryl group, a $C_6$-$C_{30}$ aryl group, a $C_6$-$C_{20}$ aryl group, or a $C_6$-$C_{10}$ aryl group. A representative aryl group includes (for example) phenyl, methylphenyl, propylphenyl, isopropylphenyl, benzyl and naphthalen-1-yl, naphthalen-2-yl and the like. Additionally, the aryl group can be optionally substituted.

The term "heterocyclic group" covers both aromatic and non-aromatic cyclic groups. Heteroaromatic cyclic groups also mean heteroaryl groups. In some embodiments, the heteroaromatic cyclic group and hetero-non-aromatic cyclic group include a $C_1$-$C_{50}$ heterocyclyl group, a $C_1$-$C_{40}$ heterocyclyl group, a $C_1$-$C_{30}$ heterocyclyl group, a $C_1$-$C_{20}$ heterocyclyl group, a $C_1$-$C_{10}$ heterocyclyl group, or a $C_1$-$C_6$ heterocyclyl group having at least one heteroatom. For example, the heterocyclic group may be morpholinyl, piperidinyl, pyrrolidinyl, and cyclic ethers, for example, tetrahydrofuran, tetrahydropyran, and the like. Additionally, the heterocyclic group can be optionally substituted.

As used herein, the term "heteroaryl group" covers a monocyclic heteroaromatic group which may include one to three heteroatoms, for example, pyrrole, furan, thiophene, imidazole, oxazole, thiazole, triazole, pyrazole, pyridine, pyrazine, pyrimidine, and the like. The term heteroaryl group also includes a polycyclic heteroaromatic system having two or more rings in which two atoms are shared by two adjacent rings (where the ring is "fused"), in which at least one of the rings is a heteroaryl group, and the other rings may be a cycloalkyl group, a cycloalkenyl group, an aryl group, a heterocyclyl group and/or a heteroaryl group. For example, the heteroaryl group may be a $C_6$-$C_{50}$ heteroaryl group, a $C_6$-$C_{40}$ heteroaryl group, a $C_6$-$C_{30}$ heteroaryl group, a $C_6$-$C_{20}$ heteroaryl group, or a $C_6$-$C_{10}$ heteroaryl group. Additionally, the heteroaryl group can be optionally substituted.

As used herein, the term "heteroatom" covers O, S, P, N, B or their isosteres.

As used herein, the term "halogen" may be F, Cl, Br or I.

As used herein, the term "nitrile group" covers an organic radical containing the organic group —CN.

When the above substituents are substituted, the substituent is selected from the group consisting of halogen, an alkyl group, a cycloalkyl group, an alkenyl group, an aryl group, and a heteroaryl group.

I. Gel Polymer Electrolyte

An embodiment of the present application provides a gel polymer electrolyte, wherein the gel polymer electrolyte comprises a polymer film and an organic electrolytic solution. One main characteristic of the gel polymer electrolyte of the present application is that the organic electrolytic solution comprises a lithium salt, a phosphate ester compound and a fluoroether compound.

In some embodiments, based on the total weight of the organic electrolytic solution, the weight percentage (X) of the phosphate ester compound and the weight percentage (Y) of the fluoroether compound meet the conditions represented by Formula (1) and Formula (2) below:

about 20 wt %≤$X+Y$<about 85 wt %  (1); and about 0.2≤$X/Y$≤about 5  (2).

In some embodiments, X and Y meet the conditions represented by Formula (1) and Formula (2) below:

about 35 wt %≤$X+Y$<about 85 wt %  (1); and about 0.5≤$X/Y$≤about 5  (2).

In some embodiments, X and Y meet the conditions represented by Formula (1) and Formula (2) below:

about 50 wt %≤$X+Y$<about 80 wt %  (1); and about 0.7≤$X/Y$≤about 4  (2).

In some embodiments, X and Y meet the conditions represented by Formula (1) and Formula (2) below:

about 60 wt %≤$X+Y$<about 80 wt %  (1); and about 0.7≤$X/Y$≤about 3  (2).

In some embodiments, X and Y meet: the value of X+Y is about 20, about 30, about 40, about 60, about 65, about 70 or about 75, and the value of X/Y is about 0.6, about 0.8, about 1, about 1.5, about 2 or about 3.

In some embodiments, the weight percentage (X) of the phosphate ester compound is about 5-80 wt %. In some embodiments, the weight percentage (X) of the phosphate ester compound is about 10-70 wt %. In some embodiments, the weight percentage (X) of the phosphate ester compound is about 20-65 wt %. In some embodiments, the weight percentage (X) of the phosphate ester compound is about 25-55 wt %. In some embodiments, the weight percentage (X) of the phosphate ester compound is about 30 wt %, about 40 wt %, about 50 wt %, or about 60 wt %.

In some embodiments, the weight percentage (Y) of the fluoroether compound is about 5-80 wt %. In some embodiments, the weight percentage (Y) of the fluoroether compound is about 10-70 wt %. In some embodiments, the weight percentage (Y) of the fluoroether compound is about 15-50 wt %. In some embodiments, the weight percentage (Y) of the fluoroether compound is about 20-40 wt %. In some embodiments, the weight percentage (Y) of the fluoroether compound is about 25 wt %, about 30 wt %, about 35 wt %, about 40 wt %, about 45 wt %, about 50 wt %, about 55 wt % or about 60 wt %.

In some embodiments, the phosphate ester compound is selected from a compound of Formula (I):

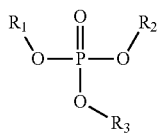

·Formula I where $R_1$, $R_2$ and $R_3$ are each independently a substituted or unsubstituted saturated hydrocarbyl having 1 to 10 carbon atoms, a substituted or unsubstituted unsaturated hydrocarbyl having 1 to 10 carbon atoms, a substituted or unsubstituted aryl group having 6 to 20 carbon atoms, or a substituted or unsubstituted hydrocarbyloxy group having 1 to 10 carbon atoms, wherein when substituted, the substituent is selected from halogen.

In some embodiments, $R_1$, $R_2$, and $R_3$ are each independently an alkyl group having 1-8 carbon atoms that is unsubstituted or substituted with fluorine, an alkenyl group having 2-8 carbon atoms that is unsubstituted or substituted with fluorine, or an aryl group having 6-10 carbon atoms that is unsubstituted or substituted with fluorine.

In some embodiments, $R_1$, $R_2$ and $R_3$ are each independently methyl, ethyl, propyl, allyl, butyl, octyl, phenyl, fluoromethyl, difluoromethyl, trifluoromethyl, fluoroethyl, chloroethyl, dichloroethyl, trichloroethyl, trifluoroethyl, tetrafluoroethyl, perfluoroethyl, dichloropropyl, trichloropropyl, trifluoropropyl or perfluoropropyl.

In some embodiments, the phosphate ester compound is one or more phosphate ester compounds selected from trimethyl phosphate, triethyl phosphate, tripropyl phosphate, triallyl phosphate, tributyl phosphate, trioctyl phosphate, triphenyl phosphate, tris(chloroethyl) phosphate, tris(1,3-difluoropropyl) phosphate, and tris(trifluoroethyl) phosphate.

In some embodiments, the fluoroether compound is selected from a compound of Formula (II):

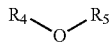

Formula II wherein $R_4$ and $R_5$ are each independently a saturated hydrocarbyl having 1 to 8 carbon atoms, an unsaturated hydrocarbyl having 1 to 8 carbon atoms, a saturated hydrocarbyl having 1 to 10 carbon atoms that is partially or completely substituted by a fluorine atom, or an unsaturated hydrocarbyl having 1 to 10 carbon atoms that is partially or completely substituted by a fluorine atom.

In some embodiments, $R_4$ and $R_5$ are each independently an alkyl group having 1-8 carbon atoms that is unsubstituted or substituted with fluorine or an alkenyl group having 2-8 carbon atoms that is unsubstituted or substituted with fluorine.

In some embodiments, $R_4$ and $R_5$ are each independently methyl, ethyl, propyl, allyl, butyl, octyl, fluoromethyl, difluoromethyl, trifluoromethyl, fluoroethyl, difluoroethyl, trifluoroethyl, tetrafluoroethyl, pentafluoroethyl, perfluoroethyl, fluoropropyl, difluoropropyl, trifluoropropyl, tetrafluoropropyl, perfluoropropyl, fluorobutyl, difluorobutyl, trifluorobutyl, tetrafluoropropyl, perfluorobutyl, fluoropentyl, tetrafluoropentyl, perfluoropentyl, fluorohexyl, tetrafluorohexyl, or perfluorohexyl.

In some embodiments, the fluoroether compound is one or more fluoroether compounds selected from: $CF_3CH_2OCH_2CF_3$, $HCF_2CF_2OCF_2CF_2H$, $HCF_2CF_2CH_2OCF_2CF_2H$, $CF_3CF_2OCF_2CF_3$, $HCF_2CF_2OCH_2CF_2CF_2H$, $(CF_3)_2CFCF(CF_2CF_3)(OCH_3)$, $CF_3CHFCF_2CH(CH_3)OCF_2CHFCF_3$, $HCF_2CF_2CH_2OCF_2CF_2CF_2CF_2H$ or $HCF_2CF_2OCH_2CF_3$.

In some embodiments, the organic electrolytic solution further comprises an additive which can form a dense and stable SEI (Solid Electrolyte Interface) film on the surface of the anode, to effectively improve the cycle performance of the battery.

In some embodiments, the additive is one or more additives selected from: vinylethylene carbonate (VEC), lithium bis(oxalato) borate (LiBOB), lithium difluoro(oxalato) borate (LiDFOB), lithium tetrafluoroborate ($LiBF_4$), methylene methanedisulfonate (MMDS), 4-ethylene trifluoromethylcarbonate, 1,3,2-dioxazolthiophene-2,2-dioxide (DTD), fluoroethylene carbonate (FEC), ethylene sulfite (ES), vinylene carbonate (VC), succinic anhydride (SA), propylene sulfite (PS), propenyl-1,3-sultone, bis (trimethylsilyl) sulfate, lithium nitrate (LiNO3), N-methyl butyl pyrrolidinium bis(trifluoromethylsulfonyl)imide, N-methyl propyl piperidinium bis(trifluoromethylsulfonyl)imide, 1,3-dioxane or 1,4-dioxane.

In some embodiments, based on the total weight of the organic electrolytic solution, the weight percentage of the additive is about 0.1-10 wt %. In some embodiments, the weight percentage of the additive is about 0.5-9 wt %. In some embodiments, the weight percentage of the additive is about 1-8 wt %. In some embodiments, the weight percentage of the additive is about 2-8 wt %. In some embodiments, the weight percentage of the additive is about 3-7 wt %. In some embodiments, the weight percentage of the additive is about 4-6 wt %.

In some embodiments, the polymer film comprises a polymer matrix, wherein the polymer matrix is one or more selected from the following polymers: a polyether polymer, a polyamine polymer, a polythioether polymer, a polyacrylate polymer, and a polymer obtained by copolymerizing or blending the above polymers, or modifying the above polymers with functional groups.

In some embodiments, the substance for blending is one or more compounds selected from: $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_2O$, $LiF$, $LiOH$, $Li_2CO_3$, $LiAlO_2$, a $Li_2O-Al_2O_3-SiO_2-P_2O_5-TiO_2-GeO_2$ ceramic, a lithium titanium phosphate, wherein the lithium titanium phosphate is $LixTiy(PO_4)_3$ and wherein $0<x<2$ and $0<y<3$, a lithium aluminum titanium phosphate, wherein the lithium aluminum titanium phosphate is $LixAlyTiz(PO_4)_3$, and wherein $0<x<2$, $0<y<1$, and $0<z<3$, $Li_{1+x+y}$ (Al, Ga)$_x$ (Ti, Ge)$_{2-x}Si_yP_{3-y}O_{12}$, and wherein $0 \le x \le 1$ and $0 \le y \le 1$, a lithium lanthanum titanate, wherein the lithium lanthanum titanate is $Li_xLa_yTiO_3$, and wherein $0<x<2$ and $0<y<3$, a lithium germanium thiophosphate, wherein the lithium germanium thiophosphate is $Li_xGe_yP_zS_w$, and wherein $0<x<4$, $0<y<1$, $0<z<1$, and $0<w<5$, a lithium nitride, wherein the lithium nitride is $Li_xN_y$, and wherein $0<x<4$ and $0<y<2$, $SiS_2$ glass, where the $SiS_2$ glass is $Li_xSi_yS_z$, and wherein $0\le x<3$, $0<y<2$ and $0<z<4$, $P_2S_5$ glass, where the $P_2S_5$ glass is $Li_xP_yS_z$, and wherein $0\le x<3$, $0<y<3$ and $0<z<7$) or a garnet ceramic, wherein the garnet ceramic is $Li_{3+x}La_3M_2O_{12}$, and wherein $0\le x\le 5$ and M is Te, Nb, or Zr.

In some embodiments, the polymer matrix is selected from a polymer of Formula III:

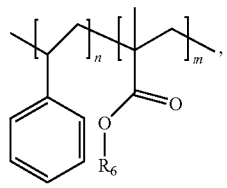

Formula III where each $R_6$ is independently a substituted or unsubstituted alkyl group having 1 to 12 carbon atoms, a substituted or unsubstituted cycloalkyl group having 3 to 12 carbon atoms, a substituted or unsubstituted alkenyl group having 2 to 12 carbon atoms, a substituted or unsubstituted alkynyl group having 3 to 12 carbon atoms, a substituted or unsubstituted aryl group having 6 to 20 carbon atoms, or a substituted or unsubstituted heterocyclyl group having 1 to 12 carbon atoms, where when substituted, the substituent is one or more selected from halo, cations, cyano or carboxyl, in which the cation is one or more selected from imidazolium cations, pyridinium cations, quaternary ammonium cations, quaternary phosphonium cations, triazolium cations, pyrrolidinium cations, piperidinium cations, guanidinium cations, mazolium cations, azolidinium cations, amino acid cations or sulfonium cations; and n and m independently denote any integer from about 1 to 100,000.

In some embodiments, the polymer film further comprises an ionic liquid. The introduction of an ionic liquid into a gel polymer electrolyte can improve ionic conductivity and electrochemical stability.

In some embodiments, the ionic liquid comprises a cation and an anion, wherein the cation is one or more selected from: imidazolium cations, pyridinium cations, quaternary ammonium cations, quaternary phosphonium cations, triazolium cations, pyrrolidinium cations, piperidinium cations, guanidinium cations, mazolium cations, azolidinium cations, amino acid cations, or sulfonium cations; and wherein the anion is one or more selected from: tetrafluoroborate anions, hexafluorophosphate anions, sulfate anions, lactate anions, p-toluenesulfonate anions, acetylsulfonimide anions, saccharin anions, amino acid anions, dicyanamide anions, difluorosulfonimide anions or bis(trifluoromethyl)sulfonimide anions.

In some embodiments, the ionic liquid can be prepared with the following compounds by a one-step method (alkyl substitution) or two-step method (alkyl substitution+ion exchange): n-butyl chloride, n-butyl bromide, propyl bromide, pentyl bromide, hexyl bromide, pyridine, N-methylimidazole, N-methylmorpholine, aluminum trichloride, and silver tetrafluoroborate, etc.

In some embodiments, the ionic liquid is selected from:

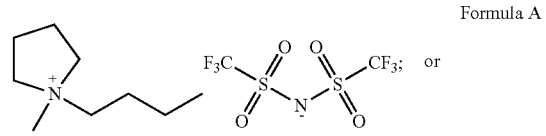

Formula A

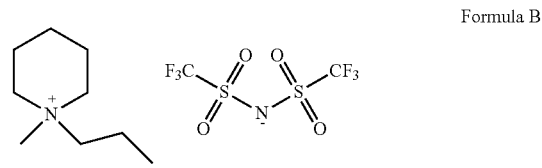

Formula B or a combination thereof.

In some embodiments, based on the weight of the polymer film, the weight percentage of the ionic liquid is about 1-40 wt %. In some embodiments, the weight percentage of the ionic liquid is about 5-35 wt %. In some embodiments, the weight percentage of the ionic liquid is about 10-30 wt %. In some embodiments, the weight percentage of the ionic liquid is about 10 wt %, about 20 wt %, about 30 wt % or about 35 wt %.

In some embodiments, the lithium salt is one or more selected from: lithium perchlorate, lithium hexafluoroarsenate, lithium hexafluorophosphate, lithium bis(trifluoromethanesulfonyl) imide, lithium bis-(fluoro-sulfonyl)imide, lithium bis(oxalato) borate, lithium oxalyldifluoroborate, lithium tetrafluoroborate, lithium trifluoromethanesulfonate, lithium difluorophosphate, an aromatic heterocyclic lithium salt, or a combination thereof.

In some embodiments, the aromatic heterocyclic lithium salt is one or more selected from the following aromatic heterocyclic lithium salts:

Formula IV

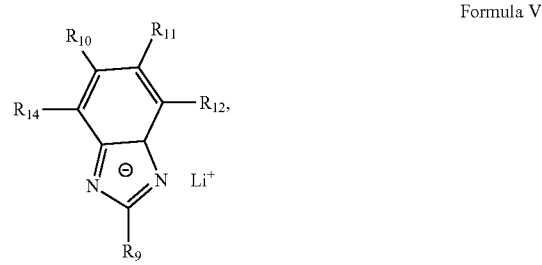

Formula V

Formula VI

-continued

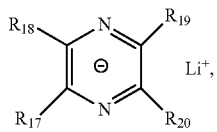

Formula VII wherein $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, and $R_{20}$ are each independently H, F, cyano, an alkyl group having 1 to 20 carbon atoms, a fluoroalkyl group having 1 to 20 carbon atoms, an alkenyl group having 2 to 20 carbon atoms, a fluoroalkenyl group having 2 to 20 carbon atoms, an aryl group having 6 to 26 carbon atoms, a fluoroaryl group having 6 to 26 carbon atoms, an alkylnitrile group having 2 to 21 carbon atoms, an alkenylnitrile group having 3 to 21 carbon atoms, or an arylnitrile group having 7 to 27 carbon atoms.

In some embodiments, the lithium salt is selected from:

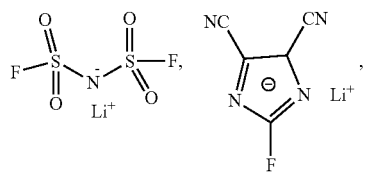

or a combination thereof.

In some embodiments, based on the total weight of the organic electrolytic solution, the content of the lithium salt is about 15-70 wt %. In some embodiments, the content of the lithium salt is about 20-60 wt %. In some embodiments, the content of the lithium salt is about 30-50 wt %. In some embodiments, the content of the lithium salt is about 30-45 wt %.

II. Electrochemical Device

The electrochemical device of the present application includes any device in which an electrochemical reaction occurs, and specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery. In some embodiments, the electrochemical device of the present application includes a cathode having a cathode active material capable of absorbing and releasing metal ions; an anode having a anode active material capable of absorbing and releasing metal ions; and an electrolytic solution of the present application.

1. Gel Polymer Electrolyte

The gel polymer electrolyte used in the lithium ion battery of the present application is any gel polymer electrolyte described above in the present application. Moreover, the gel polymer electrolyte used in the lithium ion battery of the present application may further include other gel polymer electrolytes falling within the scope of the present application.

2. Electrodes

(1) Anode

The anode material used in the electrochemical device of the present application, and the construction and manufacturing methods thereof may include any technique disclosed in the prior art. In some embodiments, the anode may be one described in U.S. Pat. No. 9,812,739B, which is incorporated herein by reference in its entirety.

In some embodiments, the anode includes a current collector and an anode active material layer on the current collector, wherein the anode active material layer includes an anode active material that reversibly intercalates/deintercalates lithium ions. In some embodiments, the anode active material includes, but is not limited to, a carbon material, a metal compound, an oxide, a sulfide, a nitride of lithium such as $LiN_3$, lithium metal, a metal that forms alloys with lithium and a polymer material.

In some embodiments, a material having a charging and discharging voltage close to that of lithium metal is selected to be the anode active material. This is because the lower the charge and discharge voltages of the anode material are, the higher the energy density of the battery is. The anode material may be a carbon material, because the crystal structures of the carbon material are only slightly changed during charging and discharging. Therefore, good cycle characteristics and large charge and discharge capacities can be achieved. Examples of the carbon material include, but are not limited to, low graphitized carbon, carbon susceptible to graphitization, artificial graphite, natural graphite, mesocarbon microbeads, soft carbon, hard carbon, pyrolytic carbon, coke, vitreous carbon, a sintered body of an organic polymer compound, carbon fibers and activated carbon. Wherein, coke may include pitch coke, needle coke and petroleum coke. The sintered body of an organic polymer compound refers to a material obtained by calcining a polymer material such as a phenolic plastic or a furan resin at a suitable temperature so as to carbonize them, and some of these materials are classified into low graphitized carbon or carbon susceptible to graphitization. Examples of the polymer material may include polyacetylene and polypyrrole.

Further, the anode active material capable of reversibly intercalating/deintercalating lithium ions may include elemental lithium metal, metal elements and semimetal elements capable of forming an alloy with lithium (Li), alloys and compounds including such elements, and the like. In some embodiments, when the anode includes lithium metal, an anode active material layer is formed from a conductive skeleton of a twisted spherical shape and metal particles dispersed in the conductive skeleton, wherein the conductive skeleton of a twisted spherical shape may have a porosity of about 5% to about 85%, and a protective layer may be further disposed on the anode active material layer of lithium metal. In some embodiments, they are used with a carbon material. In this case, good cycle characteristics and high energy density can be achieved. In addition to alloys comprising two or more metal elements, the alloys used herein also include those comprising one or more metal elements and one or more semi-metal elements. The alloy may be a solid solution in the form of an eutectic crystal, an intermetallic compound, and a mixture thereof.

Examples of the metal elements and the semimetal elements may include tin (Sn), lead (Pb), aluminum (Al), indium (In), silicon (Si), zinc (Zn), antimony (Sb), bismuth (Bi), Cadmium (Cd), magnesium (Mg), boron (B), gallium (Ga), germanium (Ge), arsenic (As), silver (Ag), zirconium (Zr), ytterbium (Y) and hafnium (Hf). Examples of the above alloys and compounds may include a material having the chemical formula: $Ma_sMb_tLi_u$ and a material having the chemical formula: $Ma_pMc_qMd_r$. In these chemical formulae, Ma represents at least one of a metal element and a semimetal element capable of forming an alloy with lithium; Mb represents at least one of the metal elements and the semi-metal elements other than lithium and Ma; Mc represents at least one of the non-metallic elements; Md represents at least one of the metal elements and the semi-metal elements other than Ma; and s, t, u, p, q, and r meet: s>0, t≥0, u≥0, p>0, q>0 and r≥0.

In some embodiments, when the anode includes an alloy material, an anode active material layer can be formed by vapor deposition, sputtering, or plating.

In addition, an inorganic compound free of lithium, such as $MnO_2$, $V_2O_5$, $V_6O_{13}$, NiS and MoS, may be used in the anode. In some embodiments, the anode active material layer may comprise a binder, and optionally comprises a conductive material. The binder increases the binding force of the anode active material particles with each other and the binding force of the anode active material to the current collector. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resins, Nylon and so on.

In some embodiments, the conductive material includes, but is not limited to, a carbon-based material, a metal-based material, a conductive polymer, or a mixture thereof. In some embodiments, the carbon-based material is selected from natural graphite, artificial graphite, carbon black, acetylene black, ketjen black, carbon fiber, or any combinations thereof. In some embodiments, the metal-based material is selected from metal powders, metal fibers, copper, nickel, aluminum, and silver. In some embodiments, the conductive polymer is a polyphenylene derivative.

In some embodiments, the current collector includes, but is not limited to, copper foil, nickel foil, stainless steel foil, titanium foil, foamed nickel, foamed copper, polymeric substrates coated with a conductive metal, and any combinations thereof.

The anode can be produced by a production method well known in the art. For example, the anode can be obtained by the following method: mixing an active material, a conductive material and a binder in a solvent to prepare an active material composition, and coating the active material composition on a current collector. In some embodiments, the solvent may include, but is not limited to, N-methylpyrrolidone or the like.

(2) Cathode

The cathode material used in the electrochemical device of the present application, and the construction and manufacturing methods thereof may be any technique disclosed in the prior art. In some embodiments, the cathode may be one described in U.S. Pat. No. 9,812,739B, which is incorporated herein by reference in its entirety.

In some embodiments, the cathode includes a current collector and a cathode active material layer on the current collector. The cathode active material includes at least one lithiation intercalation compound that reversibly intercalates and deintercalates lithium ions. In some embodiments, the cathode active material comprises a composite oxide. In some embodiments, the composite oxide contains lithium and at least one element selected from cobalt, manganese, and nickel.

In some embodiments, the cathode active material includes, but is not limited to, $Li_aA_{1-b}X_bD_2$ (0.90≤a≤1.8, 0≤b≤0.5),
$Li_aE_{1-b}X_bO_{2-c}D_3$ (0.90≤a≤1.8, 0≤b≤0.5, 0≤c≤0.05),
$Li_aE_{2-b}X_bD_4$ (0.90≤a≤1.8, 0≤b≤0.5),
$Li_aE_{2-b}X_bO_{4-c}D_c$ (0.90≤a≤1.8, 0≤b≤0.5, 0≤c≤0.05),
$Li_aNi_{1-b-c}Co_bX_cD_\alpha$ (0.90≤a≤1.8, 0≤b≤0.5, 0≤c≤0.05, 0<α≤2),
$Li_aNi_{1-b-c}Co_bX_cO_{2-\alpha}T_\alpha$ (0.90≤a≤1.8, 0≤b≤0.5, 0≤c≤0.05, 0<α<2),
$Li_aNi_{1-b-c}Co_bX_cO_{2-\alpha}T_2$ (0.90≤a≤1.8, 0≤b≤0.5, 0≤c≤0.05, 0<α<2),
$Li_aNi_{1-b-c}Mn_bX_cD_\alpha$ (0.90≤a≤1.8, 0≤b≤0.5, 0≤c≤0.05, 0<α≤2),
$Li_aNi_{1-b-c}Mn_bX_cO_{2-\alpha}T_\alpha$ (0.90≤a≤1.8, 0≤b≤0.5, 0≤c≤0.05, 0<α<2),
$Li_aNi_{1-b-c}Mn_bX_cO_{2-\alpha}T_2$ (0.90≤a≤1.8, 0≤b≤0.5, 0≤c≤0.05, 0<α<2),
$Li_aNi_bE_cG_dO_2$ (0.90≤a≤1.8, 0≤b≤0.9, 0≤c≤0.5, 0.001≤d≤0.1),
$Li_aNi_bCo_cMn_dG_eO_2$ (0.90≤a≤1.8, 0≤b≤0.9, 0≤c≤0.5, 0≤d≤0.5, 0.001≤e≤0.1),
$Li_aNiG_bO_2$ (0.90≤a≤1.8, 0.001≤b≤0.1),
$Li_aCoG_bO_2$ (0.90≤a≤1.8, 0.001≤b≤0.1),
$Li_aMnG_bO_2$ (0.90≤a≤1.8, 0.001≤b≤0.1),
$Li_aMn_2G_bO_4$ (0.90≤a≤1.8, 0.001≤b≤0.1),
$QO_2$, $QS_2$, $LiQS_2$, $V_2O_5$, $LiV_2O_5$, $LiIO_2$, $LiNiVO_4$, $Li_{(3-f)}J_2(PO_4)_3$ (0≤f≤2), $Li_{(3-f)}Fe_2(PO_4)_3$ (0≤f≤2) or $LiFePO_4$, wherein A is selected from Ni, Co, Mn and any combinations thereof; X is selected from Al, Ni, Co, Mn, Cr, Fe, Mg, Sr, V, rare earth elements and any combinations thereof; D is selected from O, F, S, P and any combinations thereof; E is selected from Co, Mn and any combinations thereof; T is selected from F, S, P and any combinations thereof; G is selected from Al, Cr, Mn, Fe, Mg, La, Ce, Sr, V and any combinations thereof; Q is selected from Ti, Mo, Mn and any combinations thereof; I is selected from Cr, V, Fe, Sc, Y and any combinations thereof; and J is selected from V, Cr, Mn, Co, Ni, Cu and any combinations thereof.

In some embodiments, the cathode active material is selected from lithium cobaltate ($LiCoO_2$), lithium nickel cobalt manganese (NCM) ternary material, lithium iron phosphate ($LiFePO_4$), lithium manganate ($LiMn_2O_4$) or any combinations thereof.

In some embodiments, the cathode active material may have a coating on its surface or may be mixed with another compound having a coating. The coating may include at least one coating element compound selected from an oxide of a coating element, a hydroxide of a coating element, an oxyhydroxide of a coating element, an oxycarbonate of a coating element, and a hydroxycarbonate of a coating element. The compound used for the coating may be an amorphous or crystalline compound.

In some embodiments, the coating element contained in the coating may include Mg, Al, Co, K, Na, Ca, Si, Ti, V, Sn, Ge, Ga, B, As, Zr or any combinations thereof. The coating can be applied by any method as long as the method does not adversely affect the performance of the cathode active material. For example, the method may include any coating method known in the art, such as spraying, dipping, and others.

The cathode active material layer further comprises a binder, and optionally comprises a conductive material. The binder increases the binding force of the cathode active material particles to each other and the binding force of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resins, Nylon and so on.

In some embodiments, the conductive material includes, but is not limited to, a carbon-based material, a metal-based material, a conductive polymer, and a mixture thereof. In some embodiments, the carbon-based material is selected from natural graphite, artificial graphite, carbon black, acetylene black, ketjen black, carbon fiber, or any combinations thereof. In some embodiments, the metal-based material is selected from metal powders, metal fibers, copper, nickel, aluminum, and silver. In some embodiments, the conductive polymer is a polyphenylene derivative.

In some embodiments, the current collector may be, but is not limited to, aluminum.

The cathode can be prepared by a preparation method well known in the art. For example, the cathode can be obtained by the following method: mixing an active material, a conductive material and a binder in a solvent to prepare an active material composition, and coating the active material composition on a current collector. In some embodiments, the solvent may include, but is not limited to, N-methylpyrrolidone or the like.

III. Application

The electrolytic solution according to the present application can inhibit the increase in DC internal resistance of the electrochemical device, so that the manufactured electrochemical device is suitable for electronic devices in various fields.

The use of the electrochemical device of the present application is not particularly limited and can be used for any purpose known in the art. In an embodiment, the electrochemical device according to the present application can be used in, but not limited to, notebook computers, pen-input computers, mobile computers, e-book players, portable phones, portable fax machines, portable copiers, portable printers, head-mounted stereo headphones, video recorders, LCD TVs, portable cleaners, portable CD players, mini discs, transceivers, electronic notebooks, calculators, memory cards, portable recorders, radios, backup power sources, motors, vehicles, motorcycles, scooters, bicycles, lighting apparatuses, toys, game consoles, clocks, electric tools, flashing lights, cameras, large batteries for household use, and lithium ion capacitors.

EXAMPLES

The performance evaluation of the lithium ion batteries in the examples and comparative examples of the present application is described below.

1. Preparation of a Lithium-Ion Battery

(1) Preparation of a Cathode

The cathode active material lithium cobaltate ($LiCoO_2$), the conductive agent Super P, and the binder polyvinylidene fluoride were mixed at a weight ratio of 97:1.4:1.6, and N-methylpyrrolidone (NMP) was added and stirred in a vacuum mixer, until the solution became uniform to obtain a cathode slurry. The cathode slurry had a solid content of 72 wt %. The cathode slurry was uniformly coated on a cathode current collector which is an aluminum foil, dried at 85° C., cold pressed, cut, sliced, and dried under vacuum at 85° C. for 4 hours to obtain a cathode plate.

(2) Preparation of an Anode

The metal lithium was composited onto a 12 μm anode current collector which is a copper foil by physical rolling. The lithium-copper composite strip was allowed to be coated with lithium on one side by adjusting the pressure of the roller, and the thickness was controlled to 50 μm. Then, the composite strip was cut, sliced, and then placed and stored in a dry glove box under argon atmosphere.

(3) Preparation of a Gel Polymer Electrolyte

Preparation of a polymer film: an organic polymer of Formula K and an ionic liquid of Formula A or Formula B shown below at a weight ratio were dissolved in tetrahydrofuran in a dry glove box under argon atmosphere, wherein tetrahydrofuran accounted for 95% of the whole solution. The container was sealed to prevent the volatilization of the solvent from affecting the film thickness. The solution was stirred by a magnetic stirrer in the glove box to a uniform solution, and stood for 2 hours to remove any bubbles. In the glove box, the polymer solution was poured into a Teflon mold and allowed to stand in the mold until no flowing liquid was present. The mold was transferred to a vacuum oven for temperature programming, and warmed to 50° C., held for 1 hour, then the temperature was raised to 80° C., and maintained at this temperature for a sufficient time to allow the film to be dried completely. The film was stripped off and die-cut into a film.

Preparation of an organic electrolytic solution: the phosphate ester compound and the fluoroether compound were mixed fully in a dry glove box under argon atmosphere, an additive (if used) was added, dissolved and fully stirred, and then a lithium salt was added, and uniformly mixed to obtain an organic electrolytic solution.

Preparation of a gel polymer electrolyte: the polymer film prepared above was immersed in the organic electrolytic solution prepared above for 40 minutes, and then taken out to obtain a gel polymer electrolyte film.

(4) Preparation of a Lithium-Ion Battery

The cathode, the gel polymer electrolyte film, and the metal lithium anode were laminated in sequence such that the gel polymer electrolyte film was located between the cathode and anode for isolation. A tab was welded, the bare cell was placed in the outer package aluminum plastic film, packed under vacuum, stood, formed (by charging to 3.3V at a constant current of 0.02 C, then charging to 3.6 V at a constant current of 0.1 C), shaped, and capacity-tested to obtain a single-layer soft-package laminated lithium ion battery (having a width of 90 mm and a length of 63 mm).

The ionic liquid used in the example is specifically:

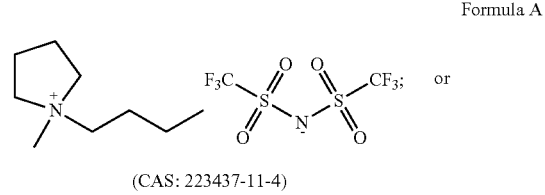

Formula A (CAS: 223437-11-4)

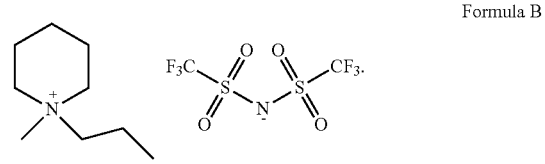

Formula B

The phosphate ester compound used in the example is specifically:

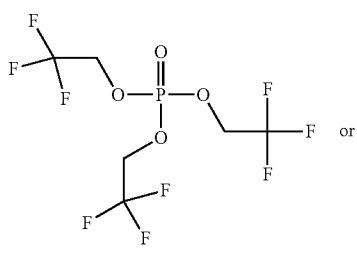

(CAS: 358-63-4)

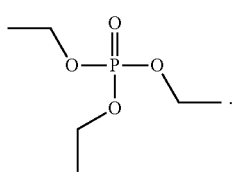

(CAS: 78-40-0)

The lithium salt used in the example is specifically:

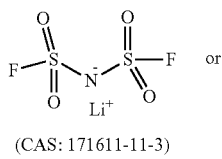

(CAS: 171611-11-3)

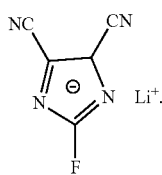

The fluoroether compound used in the example is specifically:

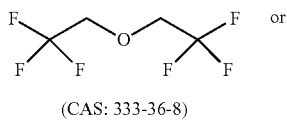

(CAS: 333-36-8)

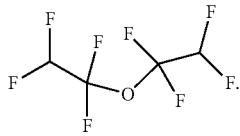

(CAS: 16627-68-2)

The additive used in the example is specifically:

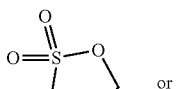

(CAS: 1120-71-4)

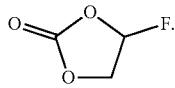

(CAS: 114435-02-8)

The organic polymer used in the example is specifically:

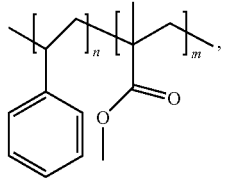

(CAS: 25034-86-0)

having a weight average molecular weight $M_w$ of 100,000-150,000, purchased from Sigma-Aldrich®, and Product No. and specification is: 462896-250G.

A. The gel polymer electrolytes and the lithium ion batteries of Examples 1 to 16 and Comparative Examples 1 to 16 shown in Table 1 were prepared according to the above preparation method, wherein the content of each substance in the organic electrolytic solution was obtained based on the total weight of the organic electrolytic solution. The lithium salt used in the gel polymer electrolytes of Examples 1 to 16 and Comparative Examples 1 to 16 is a lithium salt of Formula E, and the sum of the contents of each substance and the lithium salt in the organic electrolytic solution shown in Table 1 is 100 wt %.

TABLE 1

| | Polymer film | Organic electrolytic solution | | | | | |
|---|---|---|---|---|---|---|---|
| No. | Organic polymer of Formula K:Ionic liquid of Formula B (weight ratio) | Phosphate ester compound of Formula C (wt %) | Phosphate ester compound of Formula D (wt %) | Fluoroether compound of Formula G (wt %) | Fluoroether compound of Formula H (wt %) | X + Y (wt %) | X/Y |
| Comparative Example 1 | 9:1 | — | 35 | — | 55 | 90 | 0.64 |
| Comparative Example 2 | 9:1 | — | 10 | — | 9 | 19 | 1.11 |
| Comparative Example 3 | 9:1 | — | 30 | — | 5 | 35 | 6.00 |

TABLE 1-continued

| No. | Polymer film Organic polymer of Formula K:Ionic liquid of Formula B (weight ratio) | Organic electrolytic solution Phosphate ester compound of Formula C (wt %) | Phosphate ester compound of Formula D (wt %) | Fluoroether compound of Formula G (wt %) | Fluoroether compound of Formula H (wt %) | X + Y (wt %) | X/Y |
|---|---|---|---|---|---|---|---|
| Comparative Example 4 | 9:1 | — | 5 | — | 60 | 65 | 0.08 |
| Comparative Example 5 | 9:1 | — | 35 | 55 | — | 90 | 0.64 |
| Comparative Example 6 | 9:1 | — | 10 | 9 | — | 19 | 1.11 |
| Comparative Example 7 | 9:1 | — | 30 | 5 | — | 35 | 6.00 |
| Comparative Example 8 | 9:1 | — | 5 | 60 | — | 65 | 0.08 |
| Comparative Example 9 | 9:1 | 35 | — | — | 55 | 90 | 0.636 |
| Comparative Example 10 | 9:1 | 10 | — | — | 9 | 19 | 1.111 |
| Comparative Example 11 | 9:1 | 30 | — | — | 5 | 35 | 6.000 |
| Comparative Example 12 | 9:1 | 5 | — | — | 60 | 65 | 0.083 |
| Comparative Example 13 | 9:1 | 35 | — | 55 | — | 90 | 0.64 |
| Comparative Example 14 | 9:1 | 10 | — | 9 | — | 19 | 1.11 |
| Comparative Example 15 | 9:1 | 30 | — | 5 | — | 35 | 6.00 |
| Comparative Example 16 | 9:1 | 5 | — | 60 | — | 65 | 0.08 |
| Example 1 | 9:1 | — | 29 | — | 36 | 65 | 0.81 |
| Example 2 | 9:1 | — | 31 | — | 40 | 71 | 0.78 |
| Example 3 | 9:1 | — | 50 | — | 25 | 75 | 2.00 |
| Example 4 | 9:1 | — | 55 | — | 20 | 75 | 2.75 |
| Example 5 | 9:1 | — | 32 | 31 | — | 63 | 1.03 |
| Example 6 | 9:1 | — | 31 | 40 | — | 71 | 0.78 |
| Example 7 | 9:1 | — | 50 | 25 | — | 75 | 2.00 |
| Example 8 | 9:1 | — | 55 | 20 | — | 75 | 2.75 |
| Example 9 | 9:1 | 43 | — | — | 29 | 72 | 1.483 |
| Example 10 | 9:1 | 31 | — | — | 40 | 71 | 0.775 |
| Example 11 | 9:1 | 50 | — | — | 25 | 75 | 2.000 |
| Example 12 | 9:1 | 55 | — | — | 20 | 75 | 2.750 |
| Example 13 | 9:1 | 46 | — | 24 | — | 70 | 1.92 |
| Example 14 | 9:1 | 31 | — | 40 | — | 71 | 0.78 |
| Example 15 | 9:1 | 50 | — | 25 | — | 75 | 2.00 |
| Example 16 | 9:1 | 55 | — | 20 | — | 75 | 2.75 |

A dash "—" means that the substance is not present.

B. The gel polymer electrolytes and the lithium ion batteries of Examples 17 to 21 and Comparative Examples 17 to 23 shown in Table 2 were prepared according to the above preparation method, wherein the content of each substance in the organic electrolytic solution was obtained based on the total weight of the organic electrolytic solution; and the weight percentages of the organic polymer of Formula K and the ionic liquid of Formula A or B were obtained based on the total weight of the polymer film. The lithium salt used in the gel polymer electrolytes of Examples 1 and 17 to 21 and Comparative Examples 17 to 23 is a lithium salt of Formula E, and the sum of the contents of each substance and the lithium salt in the organic electrolytic solution shown in Table 2 is 100 wt %.

TABLE 2

| No. | Polymer film Organic polymer of Formula K (wt %) | Ionic liquid of Formula A (wt %) | Ionic liquid of Formula B (wt %) | Organic electrolytic solution Phosphate ester compound of Formula D (wt %) | Fluoroether compound of Formula H (wt %) | X + Y (wt %) | X/Y |
|---|---|---|---|---|---|---|---|
| Comparative Example 17 | 50 | 50 | — | 29 | 36 | 65 | 0.81 |
| Comparative Example 18 | 40 | 60 | — | 29 | 36 | 65 | 0.81 |

TABLE 2-continued

| | | Polymer film | | Organic electrolytic solution | | | |
| | | | | Phosphate | | | |
| No. | Organic polymer of Formula K (wt %) | Ionic liquid of Formula A (wt %) | Ionic liquid of Formula B (wt %) | ester compound of Formula D (wt %) | Fluoroether compound of Formula H (wt %) | X + Y (wt %) | X/Y |
|---|---|---|---|---|---|---|---|
| Comparative Example 19 | 30 | 70 | — | 29 | 36 | 65 | 0.81 |
| Comparative Example 20 | 100 | — | — | 29 | 36 | 65 | 0.81 |
| Comparative Example 21 | 50 | — | 50 | 29 | 36 | 65 | 0.81 |
| Comparative Example 22 | 40 | — | 60 | 29 | 36 | 65 | 0.81 |
| Comparative Example 23 | 30 | — | 70 | 29 | 36 | 65 | 0.81 |
| Example 1 | 90 | — | 10 | 29 | 36 | 65 | 0.81 |
| Example 17 | 80 | — | 20 | 29 | 36 | 65 | 0.81 |
| Example 18 | 70 | — | 30 | 29 | 36 | 65 | 0.81 |
| Example 19 | 90 | 10 | — | 29 | 36 | 65 | 0.81 |
| Example 20 | 80 | 20 | — | 29 | 36 | 65 | 0.81 |
| Example 21 | 70 | 30 | — | 29 | 36 | 65 | 0.81 |

A dash "—" means that the substance is not present.

C. The gel polymer electrolytes and the lithium ion batteries of Examples 22 to 33 and Comparative Examples 24 to 35 and 36 to 38, and the liquid electrolyte and lithium ion battery of Comparative Example 39 were prepared according to the above preparation method, wherein the content of each substance in the organic electrolytic solution was obtained based on the total weight of the organic electrolytic solution. The sum of the contents of each substance and the lithium salt in the organic electrolytic solution shown in Table 3 is 100 wt %.

The electrolyte of Comparative Example 36 in Table 3 was a solid electrolyte, the preparation method of the solid electrolyte was as follows: an organic polymer of Formula K, an ionic liquid of Formula A and a lithium salt of Formula E at a weight ratio of 8:1:1 were dissolved in tetrahydrofuran in a dry glove box under argon atmosphere, wherein tetrahydrofuran accounted for 95% of the whole solution. The container was sealed to prevent the volatilization of the solvent from affecting the film thickness. The solution was stirred by a magnetic stirrer in the glove box to a uniform solution, and allowed to stand for 2 hours to remove any bubbles. In the glove box, the polymer solution was poured into a Teflon mold and allowed to stand in the mold until no flowing liquid was present. The mold was transferred to a vacuum oven for temperature programming and warmed to 50° C., held for 1 hour, then the temperature was raised to 80° C., and maintained at this temperature for a sufficient time to allow the film to be dried completely. The film was stripped off and die-cut to obtain a solid polymer electrolyte.

TABLE 3

| No. | Polymer film Organic polymer of Formula K:Ionic liquid of Formula A (weight ratio) | Organic electrolytic solution | | | | | | | | | |
| | | Phosphate ester compound of Formula C (wt%) | Phosphate ester compound of Formula D (wt%) | Lithium salt of Formula E (wt %) | Lithium salt of Formula F (wt %) | Fluoroether compound of Formula G (wt %) | Fluoroether compound of Formula H (wt %) | Additive of Formula I (wt %) | Additive of Formula J (wt %) | X + Y (wt %) | X/Y |
|---|---|---|---|---|---|---|---|---|---|---|---|
| Comparative Example 24 | 9:1 | — | 35 | 7 | 3 | — | 55 | — | — | 90 | 0.64 |
| Comparative Example 25 | 9:1 | — | 10 | 75 | 6 | — | 9 | — | — | 19 | 1.11 |
| Comparative Example 26 | 9:1 | — | 10 | 35 | 46 | — | 9 | — | — | 19 | 1.11 |
| Comparative Example 27 | 9:1 | — | 35 | 7 | 3 | 55 | — | — | — | 90 | 0.64 |
| Comparative Example 28 | 9:1 | — | 10 | 75 | 6 | 9 | — | — | — | 19 | 1.11 |
| Comparative Example 29 | 9:1 | — | 10 | 35 | 46 | 9 | — | — | — | 19 | 1.11 |
| Comparative Example 30 | 9:1 | 35 | — | 7 | 3 | — | 55 | — | — | 90 | 0.64 |

TABLE 3-continued

| No. | Polymer film Organic polymer of Formula K:Ionic liquid of Formula A (weight ratio) | Organic electrolytic solution | | | | | | | | | |
|---|---|---|---|---|---|---|---|---|---|---|---|
| | | Phosphate ester compound of Formula C (wt%) | Phosphate ester compound of Formula D (wt%) | Lithium salt of Formula E (wt %) | Lithium salt of Formula F (wt %) | Fluoroether compound of Formula G (wt %) | Fluoroether compound of Formula H (wt %) | Additive of Formula I (wt %) | Additive of Formula J (wt %) | X + Y (wt %) | X/Y |
| Comparative Example 31 | 9:1 | 10 | — | 75 | 6 | — | 9 | — | — | 19 | 1.11 |
| Comparative Example 32 | 9:1 | 10 | — | 35 | 46 | — | 9 | — | — | 19 | 1.11 |
| Comparative Example 33 | 9:1 | 35 | — | 7 | 3 | 55 | — | — | — | 90 | 0.64 |
| Comparative Example 34 | 9:1 | 10 | — | 75 | 6 | 9 | — | — | — | 19 | 1.11 |
| Comparative Example 35 | 9:1 | 10 | — | 35 | 46 | 9 | — | — | — | 19 | 1.11 |
| Comparative Example 36 | 8:1 | — | — | 100 | — | — | — | — | — | — | — |
| Comparative Example 37 | 9:1 | — | 70 | — | 30 | — | — | — | — | 70 | — |
| Comparative Example 38 | 9:1 | — | — | — | 30 | — | 70 | — | — | 70 | — |
| Comparative Example 39 | — | — | 32 | 21 | 15 | 32 | — | — | — | 64 | 1.00 |
| Example 22 | 9:1 | — | 29 | 25 | 10 | — | 36 | — | — | 65 | 0.81 |
| Example 23 | 9:1 | — | 29 | 20 | 15 | — | 36 | — | — | 65 | 0.81 |
| Example 24 | 9:1 | — | 29 | 15 | 20 | — | 36 | — | — | 65 | 0.81 |
| Example 25 | 9:1 | — | 32 | 26 | 10 | 32 | — | — | — | 64 | 1.00 |
| Example 26 | 9:1 | — | 32 | 21 | 15 | 32 | — | — | — | 64 | 1.00 |
| Example 27 | 9:1 | — | 32 | 13 | 23 | 32 | — | — | — | 64 | 1.00 |
| Example 28 | 9:1 | 43 | — | 18 | 10 | — | 29 | — | — | 72 | 1.48 |
| Example 29 | 9:1 | 43 | — | 10 | 17 | — | 29 | — | — | 72 | 1.48 |
| Example 30 | 9:1 | 55 | — | 20 | 5 | 20 | — | — | — | 75 | 2.75 |
| Example 31 | 9:1 | 55 | — | 10 | 15 | 20 | — | — | — | 75 | 2.75 |
| Example 32 | 9:1 | — | 32 | 21 | 10 | 32 | — | 5 | — | 64 | 1.00 |
| Example 33 | 9:1 | — | 32 | 21 | 10 | 32 | — | — | 5 | 64 | 1.00 |

A dash "—" means that the substance is not present.

2. Test Method

1) Cycle Performance Test of the Lithium-Ion Battery

The lithium ion battery was placed in an incubator at 25° C. and allowed to stand for 30 minutes to allow the lithium ion battery to reach a constant temperature. The lithium ion battery on reaching a constant temperature was charged to a voltage of 4.4 V at a constant current of 0.1 C, then charged to a current of 0.05 C at a constant voltage of 4.4 V, and then discharged to a voltage of 3 V at a constant current of 0.5 C. The above was a charge/discharge cycle. The first discharge capacity was 100%. The charge/discharge cycle was repeated, and when the discharge capacity was decreased to 80%, the test was stopped, and the number of cycles was recorded and used as an index for evaluating the cycle performance of the lithium ion battery.

Meanwhile, the cycle performance of the lithium ion battery at 45° C. was tested, and the test method was the same as the test method of cycle performance at 25° C.

(2) Safety Performance Test of the Lithium-Ion Battery

At room temperature, the lithium-ion battery was discharged to 3 V at 0.5 C, allowed to stand for 5 minutes, charged to a voltage of 4.4 V at a constant current of 0.1 C, and then charged to a current of 0.05 C at a constant voltage of 4.4 V. The OCV and IMP before test were recorded, and the appearance was examined and photographed. A nail with a diameter of 2.5 mm was punctured into the center of the cell at a puncture speed of 100 mm/s and retained for 30 minutes. The OCV and the cell surface temperature were monitored during the test, and the test was stopped after 5 minutes or after the cell surface temperature decreased to 50° C. After the test was completed, the OCV and IMP after the test were recorded, and the appearance was examined and photographed. Whether the battery burns or explodes was used as an index for evaluating safety performance.

(3) Dynamic Performance Test of the Lithium-Ion Battery

At room temperature, the lithium-ion battery was charged to 4.4 V at 0.5 C, then charged to a current of 0.05 C at a constant voltage of 4.4 V, allowed to stand for 5 minutes, and discharged to a voltage of 3 V at a constant current of 0.2 C. The discharge capacity was recorded, and the discharge capacity at 0.2 C was used as a reference. The discharge capacity at 1 C was tested as follows. The lithium ion battery was charged to 4.4 V at 0.5 C, then charged to a current of 0.05 C at a constant voltage of 4.4 V, allowed to stand for 5 minutes, and discharged to a voltage of 3 V at a constant current of 1 C. The discharge capacity was recorded. The capacity retention rate was calculated according to the following formula:

Capacity retention rate=Discharge capacity at 1 C/Discharge capacity at 0.2 C*100%

The performance test results of Examples 1-33 and Comparative Example 1-39 are shown in Table 4.

TABLE 4

| Group of tested batteries | Cycle performance Cycle number at 25° C. | Cycle performance Cycle number at 45° C. | Safety performance Numbers of acceptable tests/number of tests | Dynamic performance Capacity retention rate (%) |
|---|---|---|---|---|
| Example 1 | 307 | 205 | 10/10 | 94.1 |
| Example 2 | 300 | 203 | 10/10 | 93.8 |
| Example 3 | 308 | 200 | 10/10 | 93.2 |
| Example 4 | 300 | 208 | 10/10 | 93.1 |
| Example 5 | 311 | 203 | 10/10 | 94.2 |
| Example 6 | 305 | 210 | 10/10 | 93.4 |
| Example 7 | 305 | 206 | 10/10 | 93.5 |
| Example 8 | 301 | 204 | 10/10 | 93 |
| Example 9 | 308 | 206 | 10/10 | 93.6 |
| Example 10 | 304 | 205 | 10/10 | 93.4 |
| Example 11 | 304 | 208 | 10/10 | 92.9 |
| Example 12 | 303 | 208 | 10/10 | 92.9 |
| Example 13 | 310 | 204 | 10/10 | 94.1 |
| Example 14 | 307 | 203 | 10/10 | 93.4 |
| Example 15 | 309 | 210 | 10/10 | 92.7 |
| Example 16 | 310 | 203 | 10/10 | 92.3 |
| Example 17 | 313 | 221 | 10/10 | 94.5 |
| Example 18 | 320 | 219 | 10/10 | 94.5 |
| Example 19 | 309 | 204 | 10/10 | 93.9 |
| Example 20 | 309 | 219 | 10/10 | 94.2 |
| Example 21 | 322 | 215 | 10/10 | 94.5 |
| Example 22 | 316 | 217 | 10/10 | 94.1 |
| Example 23 | 320 | 222 | 10/10 | 93.9 |
| Example 24 | 336 | 223 | 10/10 | 94.2 |
| Example 25 | 313 | 216 | 10/10 | 92.2 |
| Example 26 | 321 | 224 | 10/10 | 92.3 |
| Example 27 | 333 | 225 | 10/10 | 92.2 |
| Example 28 | 319 | 221 | 10/10 | 89.1 |
| Example 29 | 330 | 222 | 10/10 | 89.2 |
| Example 30 | 318 | 223 | 10/10 | 88.6 |
| Example 31 | 331 | 221 | 10/10 | 88.2 |
| Example 32 | 325 | 228 | 10/10 | 91.8 |
| Example 33 | 330 | 232 | 10/10 | 92 |
| Comparative Example 1 | 40 | 20 | 0/10 | 75.2 |
| Comparative Example 2 | 79 | 89 | 2/10 | 20.2 |
| Comparative Example 3 | 28 | 50 | 5/10 | 62.3 |
| Comparative Example 4 | 52 | 30 | 0/10 | 82.3 |
| Comparative Example 5 | 42 | 22 | 0/10 | 75.3 |
| Comparative Example 6 | 80 | 86 | 2/10 | 21.5 |
| Comparative Example 7 | 30 | 51 | 5/10 | 64.3 |
| Comparative Example 8 | 50 | 32 | 0/10 | 84.2 |
| Comparative Example 9 | 42 | 22 | 0/10 | 76.3 |
| Comparative Example 10 | 80 | 89 | 2/10 | 22.5 |
| Comparative Example 11 | 30 | 53 | 5/10 | 63.4 |
| Comparative Example 12 | 50 | 32 | 0/10 | 83.1 |
| Comparative Example 13 | 43 | 22 | 0/10 | 74.8 |
| Comparative Example 14 | 85 | 85 | 2/10 | 21.6 |
| Comparative Example 15 | 31 | 53 | 5/10 | 61.9 |
| Comparative Example 16 | 48 | 29 | 0/10 | 83.1 |

TABLE 4-continued

| Group of tested batteries | Cycle performance | | Safety performance | Dynamic performance |
|---|---|---|---|---|
| | Cycle number at 25° C. | Cycle number at 45° C. | Numbers of acceptable tests/number of tests | Capacity retention rate (%) |
| Comparative Example 17 | 210 | 92 | 8/10 | 87.6 |
| Comparative Example 18 | 202 | 90 | 5/10 | 85.4 |
| Comparative Example 19 | 196 | 85 | 0/10 | 83.2 |
| Comparative Example 20 | 110 | 60 | 10/10 | 80.4 |
| Comparative Example 21 | 215 | 95 | 8/10 | 87.3 |
| Comparative Example 22 | 211 | 93 | 5/10 | 85.5 |
| Comparative Example 23 | 198 | 86 | 0/10 | 83.7 |
| Comparative Example 24 | 56 | 36 | 3/10 | 75.8 |
| Comparative Example 25 | 83 | 95 | 5/10 | 85.3 |
| Comparative Example 26 | 90 | 105 | 6/10 | 84.5 |
| Comparative Example 27 | 55 | 32 | 3/10 | 75.8 |
| Comparative Example 28 | 81 | 93 | 5/10 | 82.4 |
| Comparative Example 29 | 89 | 101 | 6/10 | 81.1 |
| Comparative Example 30 | 53 | 32 | 3/10 | 74.6 |
| Comparative Example 31 | 82 | 92 | 5/10 | 81.6 |
| Comparative Example 32 | 91 | 104 | 6/10 | 80.9 |
| Comparative Example 33 | 52 | 33 | 3/10 | 74.7 |
| Comparative Example 34 | 82 | 94 | 5/10 | 81.4 |
| Comparative Example 35 | 92 | 100 | 6/10 | 80.7 |
| Comparative Example 36 | 10 | 5 | 8/10 | 10.2 |
| Comparative Example 37 | 53 | 31 | 10/10 | 41.3 |
| Comparative Example 38 | 22 | 14 | 5/10 | 79.5 |
| Comparative Example 39 | 313 | 212 | 7/10 | 96.3 |

It can be known from the test results of Examples 1-16 that when the contents of the phosphate ester compound and the fluoroether compound in the organic electrolytic solution met both the conditions represented by: about 20 wt %≤X+Y≤about 85 wt % (1); and about 0.2≤X/Y≤about 5 (2), the gel polymer electrolyte was beneficial in improving cycle performance, safety performance, and the performance rate of the battery.

It can be known from comparison of the test results of Examples 1-16 with Comparative Examples 1, 5, 9 and 13 that when the content X of the phosphate ester compound and the content Y of the fluoroether compound met X+Y≥about 85 wt %, lithium dendrites tended to form on the surface of the anode, and the solvent easily participated in the formation of the film, resulting in an SEI film of poor effect, thereby seriously deteriorating cycle performance, safety performance and the performance rate of the battery.

It can be known from the test results of Examples 1-16 and Comparative Examples 2, 6, 10 and 14 that when the content X of the phosphate ester compound and the content Y of the fluoroether compound met X+Y<about 20 wt %, the content of the lithium salt in the organic electrolytic solution was too high, and the dynamic performance during the recycle was poor. In addition, crystallization may have occurred during the recycle, as the cycle performance and the safety performance of the battery were significantly deteriorated.

It can be known from the test results of Examples 1-16 and Comparative Examples 3, 7, 11 and 15 that when the ratio of the content X of the phosphate ester compound to the content Y of the fluoroether compound met X/Y>about 5, the content of the phosphate ester compound in the organic electrolytic solution was too high, and the viscosity of the organic electrolytic solution was very large and was possibly up to 100 cp (mPa·s) or higher, resulting in a poor infiltration to the electrode and the organic polymer film, thus affecting the cycle and performance rates of the battery.

It can be known from the test results of Examples 1-16 and Comparative Examples 4, 8, 12 and 16 that when the ratio of the content of the phosphate ester compound to the content of the fluoroether compound met X/Y<about 0.2, the content of the fluoroether compound in the organic electrolytic solution was too high, the capability of the organic electrolytic solution dissolving the lithium salt was lowered, and the flash point of the organic electrolytic solution was also lowered, thereby seriously deteriorating the safety performance of the battery.

It can be known from the test results of Example 1 and Examples 17-21 and Comparative Example 20 that when the organic polymer film did not contain an ionic liquid, the glass transition temperature of the polymer was high, electrical conductivity was low, and the cycle and performance rates of the batteries were deteriorated significantly.

It can be known from the test results of Example 1 and Examples 17-21 and Comparative Examples 17-19 and Comparative Examples 21-23 that when the weight percentage of the ionic liquid in the organic polymer film exceeded about 30%, the mechanical performance of the polymer film was degraded, and the safety performance of the battery was deteriorated. The polymer film did not have sufficient mechanical strength to inhibit the growth of lithium dendrites, which also affected the cycle performance of the battery.

It can be known from Examples 22-31 that when the lithium salt of Formula E was used in combination with the lithium salt of Formula F, the cycle performance of the lithium ion battery was improved. The lithium salt having an aromatic heterocyclic ring represented by Formula F had high stability and could form a film on the anode, and when used in combination with an additive, the formed SEI film was uniform and dense, had excellent electrical conductivity, and could prevent uneven deposition of lithium, effectively inhibited the growth of lithium dendrites and improved the cycle and safety performance of the battery.

It can be known from the performance test results of Examples 22-31 and Comparative Example 24, Comparative Example 27, Comparative Example 30 and Comparative Example 33 that when X+Y≥about 85 wt %, the concentration of the lithium salt was low, the solvent easily participated in the formation of film, resulting in SEI film of poor effect, and thus the cycle and safety performance of the battery were affected. It can be known from the test results of Comparative Example 25, Comparative Example 26, Comparative Example 28, Comparative Example 29, Comparative Example 31, Comparative Example 32, Comparative Example 34 and Comparative Example 35 that the content of the lithium salt in the organic electrolytic solution was high, the dynamic performance during the cycle was poor, thereby affecting the performance rate of the battery. Meanwhile, the cycle and safety performance of the battery were significantly deteriorated.

It can be known from the test results of Comparative Example 25 and Comparative Example 26, Comparative Example 28 and Comparative Example 29, Comparative Example 31 and Comparative Example 32, and Comparative Example 34 and Comparative Example 35 that, in the case of a high lithium salt content, when the content of the lithium salt having an aromatic heterocyclic ring represented by Formula F was increased, the cycle and safety performance of the battery were slightly improved.

It can be known from the test results of Example 1 and Comparative Example 36 that the electrolyte merely consisting of an organic polymer, an ionic liquid and a lithium salt had very low ionic conductivity and a large interface impedance, thereby greatly affecting the cycle and performance rates of the battery. The safety performance of the battery was also affected.

It can be known from the test results of Example 1 and Comparative Example 37 that, when the electrolyte consisted of an organic polymer, an ionic liquid, a lithium salt, and a phosphate ester compound, the cycle and performance rates of the electrolytic solution were deteriorated. It can be known from the test results of Example 1 and Comparative Example 38 that, when the electrolyte consisted of an organic polymer, an ionic liquid, a lithium salt, and a fluoroether compound, the cycle performance of the battery was deteriorated and the safety performance of the gel polymer electrolyte was affected, because crystallization may have occurred inside the battery, resulting in a short circuit in the battery.

It can be known from the test results of Example 26 and Comparative Example 39 that although the liquid electrolyte consisting of a lithium salt and a fluoroether compound had no effect on the cycle and performance rates of the battery, the safety performance of the battery was deteriorated.

It can be known from the test results of Example 32 and Example 33, that the addition of an additive to the organic electrolyte can improve the cycle performance of the battery. The additive could form a dense SEI film on the surface of the anode, thereby effectively improving the cycle performance of the lithium ion battery.

References throughout the specification to "some embodiments", "partial embodiments", "one embodiment", "another example", "example", "specific example" or "partial examples" mean that at least one embodiment or example of the application includes specific features, structures, materials or characteristics described in the embodiments or examples. Thus, the descriptions appear throughout the specification, such as "in some embodiments", "in an embodiment", "in one embodiment", "in another example", "in an example", "in a particular example" or "for example", are not necessarily the same embodiment or example in the application. Furthermore, the particular features, structures, materials or characteristics herein may be combined in any suitable manner in one or more embodiments or examples.

While the illustrative embodiments have been shown and described, it will be understood by those skilled in the art that the embodiments are not to be construed as limiting the present application, and modifications, substitutions and changes can be made to the embodiments without departing from the spirit and scope of the present application.

The above-described embodiments of the present application are intended to be illustrative only. Numerous alternative embodiments may be devised by persons skilled in the art without departing from the scope of the following claims.

What is claimed is:

1. A gel polymer electrolyte, comprising a polymer film and an organic electrolytic solution, wherein the organic electrolytic solution comprises a lithium salt, a phosphate ester compound, and a fluoroether compound,
   wherein the polymer film further comprises an ionic liquid, wherein the ionic liquid comprises a cation and an anion, wherein the cation is one or more selected from imidazolium cations, pyridinium cations, quaternary ammonium cations, quaternary phosphonium cations, triazolium cations, pyrrolidinium cations, piperidinium cations, guanidinium cations, mazolium cations, azolidinium cations, amino acid cations, or sulfonium cations; and
   the anion is one or more selected from tetrafluoroborate anions, hexafluorophosphate anions, sulfate anions, lactate anions, p-toluenesulfonate anions, acetylsulfonimide anions, saccharin anions, amino acid anions, dicyanamide anions, difluorosulfonimide anions or bis(trifluoromethyl)sulfonimide anions.

2. The gel polymer electrolyte according to claim 1, wherein, about 20 wt %≤$X+Y$<about 85 wt %; and about 0.2≤$X/Y$≤about 5;

wherein, X is a weight percentage of the phosphate ester compound and Y is a weight percentage of the fluoroether compound based on a total weight of the organic electrolytic solution.

3. The gel polymer electrolyte according to claim 2, wherein, about 0.6≤$X/Y$≤about 5.

4. The gel polymer electrolyte according to claim 1, wherein the phosphate ester compound is a compound of Formula I:

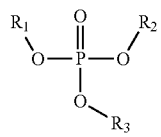

Formula I wherein $R_1$, $R_2$ and $R_3$ are each independently a substituted or unsubstituted saturated hydrocarbyl having 1 to 10 carbon atoms, a substituted or unsubstituted unsaturated hydrocarbyl having 1 to 10 carbon atoms, a substituted or unsubstituted aryl group having 6 to 20 carbon atoms, or a substituted or unsubstituted hydrocarbyloxy group having 1 to 10 carbon atoms, wherein when substituted, the substituent is selected from halogens.

5. The gel polymer electrolyte according to claim 4, wherein the phosphate ester compound is one or more phosphate ester compounds selected from trimethyl phosphate, triethyl phosphate, tripropyl phosphate, triallyl phosphate, tributyl phosphate, trioctyl phosphate, triphenyl phosphate, tris(chloroethyl) phosphate, tris(1,3-difluoropropyl) phosphate, and tris(trifluoroethyl) phosphate.

6. The gel polymer electrolyte according to claim 1, wherein the fluoroether compound is a compound of Formula II:

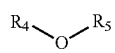

Formula II wherein $R_4$ and $R_5$ are each independently a saturated hydrocarbyl having 1 to 8 carbon atoms, an unsaturated hydrocarbyl having 1 to 8 carbon atoms, a saturated hydrocarbyl having 1 to 10 carbon atoms that is partially or completely substituted by a fluorine atom, or an unsaturated hydrocarbyl having 1 to 10 carbon atoms that is partially or completely substituted by a fluorine atom.

7. The gel polymer electrolyte according to claim 1, wherein the fluoroether compound is one or more fluoroether compounds selected from: $CF_3CH_2OCH_2CF_3$, $HCF_2CF_2OCF_2CF_2H$, $HCF_2CF_2CH_2OCF_2CF_2H$, $CF_3CF_2OCF_2CF_3$, $HCF_2CF_2OCH_2CF_2CF_2H$, $(CF_3)_2CFCF(CF_2CF_3)(OCH_3)$, $CF_3CHFCF_2CH(CH_3)OCF_2CHFCF_3$, $HCF_2CF_2CH_2OCF_2CF_2CF_2CF_2H$ or $HCF_2CF_2OCH_2CF_3$.

8. The gel polymer electrolyte according to claim 1, wherein the organic electrolytic solution further comprises an additive that is one or more additives selected from vinylethylene carbonate, lithium bis(oxalato) borate, lithium difluoro(oxalato) borate, lithium tetrafluoroborate, methylene methanedisulfonate, 4-trifluoromethylethylene carbonate, 1,3,2-dioxazolthiophene-2,2-dioxide, fluoroethylene carbonate, ethylene sulfite, vinylene carbonate, dimethyl sulfone, vinyl sulfone, diethyl sulfone, methyl vinyl sulfone, methyl ethyl sulfone, sulfolane, propylene sulfite, propenyl-1,3-sultone, bis (trimethylsilyl) sulfate, lithium nitrate, succinic anhydride, N-methylbutyl pyrrolidinium bis(trifluoromethylsulfonyl)imide, N-methylpropyl piperidinium bis(trifluoromethylsulfonyl)imide, 1,3-dioxane or 1,4-dioxane.

9. The gel polymer electrolyte according to claim 8, wherein based on the total weight of the organic electrolytic solution, the weight percentage of the additive is about 0.1-10 wt %.

10. The gel polymer electrolyte according to claim 1, wherein the polymer film comprises a polymer matrix, wherein the polymer matrix is one or more selected from a polyether polymer, a polyamine polymer, a polythioether polymer, a polyacrylate polymer, and a polymer obtained by copolymerizing or blending the above polymers, or modifying the above polymers with functional groups.

11. The gel polymer electrolyte according to claim 10, wherein a substance for blending is one or more compounds selected from $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, a lithium titanium phosphate, wherein the lithium titanium phosphate is $Li_xTi_y(PO_4)_3$, and wherein 0<x<2 and 0<y<3, a lithium aluminum titanium phosphate, wherein the lithium aluminum titanium phosphate is $Li_xAl_yTi_z(PO_4)_3$, and wherein 0<x<2, 0<y<1, and 0<z<3, $Li_{1+x+y}(Al, Ga)_x(Ti, Ge)_{2-x}Si_yP_{3-y}O_{12}$, wherein 0≤x≤1 and 0≤y≤1, a lithium lanthanum titanate, wherein the lithium lanthanum titanate is $Li_xLa_yTiO_3$, and wherein 0<x<2 and 0<y<3, a lithium germanium thiophosphate, wherein the lithium germanium thiophosphate is $Li_xGe_yP_zS_w$, wherein 0<x<4, 0<y<1, 0<z<1, and 0<w<5, a lithium nitride, wherein the lithium nitride is $Li_xN_y$, and wherein 0<x<4 and 0<y<2, $SiS_2$ glass, wherein the $SiS_2$ glass is $Li_xSi_yS_z$, and wherein 0≤x<3, 0<y<2 and 0<z<4, $P_2S_5$ glass, wherein the $P_2S_5$ glass is $Li_xP_yS_z$, and wherein 0≤x<3, 0<y<3 and 0<z<7) or a garnet ceramic, wherein the garnet ceramic is $Li_{3+x}La_3M_2O_{12}$, and wherein 0≤x≤5 and M is Te, Nb, or Zr.

12. The gel polymer electrolyte according to claim 10, wherein the polymer matrix is a polymer of Formula III:

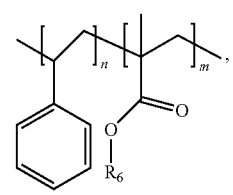

Formula III wherein each $R_6$ is independently a substituted or unsubstituted alkyl group having 1 to 12 carbon atoms, a substituted or unsubstituted cycloalkyl group having 3 to 12 carbon atoms, a substituted or unsubstituted alkenyl group having 2 to 12 carbon atoms, a substituted or unsubstituted alkynyl group having 3 to 12 carbon atoms, a substituted or unsubstituted aryl group having 6 to 20 carbon atoms, or a substituted or unsubstituted heterocyclyl group having 1 to 12 carbon atoms, wherein when substituted, the substituent is one or more selected from halogen, cations, cyano or carboxyl, wherein the cation is one or more selected from imidazolium cations, pyridinium cations, quaternary ammonium cations, quaternary phosphonium cations, triazolium cations, pyrrolidinium cations, piperidinium cations, guanidinium cations, mazolium cations, azolidinium cations, amino acid cations, or sulfonium cations; and n and m independently represent any integer from about 1 to about 100,000.

13. The gel polymer electrolyte according to claim 1, wherein the ionic liquid is selected from:

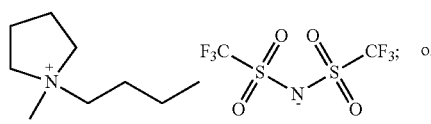

Formula A

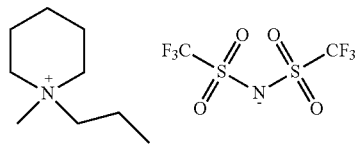

Formula B or a combination thereof.

14. The gel polymer electrolyte according to claim 1, wherein based on the total weight of the polymer film, the weight percentage of the ionic liquid is about 1-30 wt %.

15. The gel polymer electrolyte according to claim 1, wherein the lithium salt is one or more selected from lithium perchlorate, lithium hexafluoroarsenate, lithium hexafluorophosphate, lithium bis(trifluoromethanesulfonyl) imide, lithium bis-(fluoro-sulfonyl)imide, lithium bis(oxalato) borate, lithium oxalyldifluoroborate, lithium tetrafluoroborate, lithium trifluoromethanesulfonate, lithium difluorophosphate, or an aromatic heterocyclic lithium salt.

16. The gel polymer electrolyte according to claim 15, wherein the aromatic heterocyclic lithium salt is one or more selected from the following aromatic heterocyclic lithium salts:

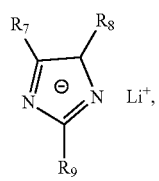

Formula IV

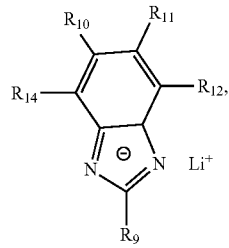

Formula V

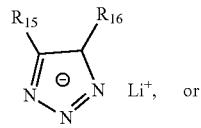

Formula VI

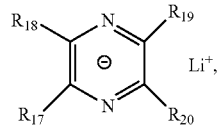

Formula VII wherein $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, and $R_{20}$ are each independently H, F, cyano, an alkyl group having 1 to 20 carbon atoms, a fluoroalkyl group having 1 to 20 carbon atoms, an alkenyl group having 2 to 20 carbon atoms, a fluoroalkenyl group having 2 to 20 carbon atoms, an aryl group having 6 to 26 carbon atoms, a fluoroaryl group having 6 to 26 carbon atoms, an alkylnitrile group having 2 to 21 carbon atoms, an alkenylnitrile group having 3 to 21 carbon atoms, or an arylnitrile group having 7 to 27 carbon atoms.

17. An electrochemical device, comprising a gel polymer electrolyte,
wherein the gel polymer electrolyte comprises a polymer film and an organic electrolytic solution, wherein the organic electrolytic solution comprises a lithium salt, a phosphate ester compound, and a fluoroether compound,
wherein the polymer film further comprises an ionic liquid, wherein the ionic liquid comprises a cation and an anion, wherein the cation is one or more selected from imidazolium cations, pyridinium cations, quaternary ammonium cations, quaternary phosphonium cations, triazolium cations, pyrrolidinium cations, piperidinium cations, guanidinium cations, mazolium cations, azolidinium cations, amino acid cations, or sulfonium cations; and
the anion is one or more selected from tetrafluoroborate anions, hexafluorophosphate anions, sulfate anions, lactate anions, p-toluenesulfonate anions, acetylsulfonimide anions, saccharin anions, amino acid anions, dicyanamide anions, difluorosulfonimide anions or bis(trifluoromethyl)sulfonimide anions.

18. An electronic device, comprising an electrochemical device,
wherein the electrochemical device comprises a gel polymer electrolyte,
wherein the gel polymer electrolyte comprises a polymer film and an organic electrolytic solution, wherein the organic electrolytic solution comprises a lithium salt, a phosphate ester compound, and a fluoroether compound, wherein the polymer film further comprises an ionic liquid, wherein the ionic liquid comprises a cation and an anion, wherein the cation is one or more selected from imidazolium cations, pyridinium cations, quaternary ammonium cations, quaternary phosphonium cations, triazolium cations, pyrrolidinium cations, piperidinium cations, guanidinium cations, mazolium cations, azolidinium cations, amino acid cations, or sulfonium cations; and the anion is one or more selected from tetrafluoroborate anions, hexafluorophosphate anions, sulfate anions, lactate anions, p-toluenesulfonate anions, acetylsulfonimide anions, saccharin anions, amino acid anions, dicyanamide anions, difluorosulfonimide anions or bis(trifluoromethyl)sulfonimide anions.

* * * * *